(12) United States Patent
Choi et al.

(10) Patent No.: US 12,467,952 B2
(45) Date of Patent: Nov. 11, 2025

(54) PROBE CARD AND SEMICONDUCTOR TEST METHOD USING THE SAME

(71) Applicant: SAMSUNG ELECTRONICS CO., LTD., Suwon-si (KR)

(72) Inventors: Byungwook Choi, Seoul (KR); Seong Yeon Wi, Suwon-si (KR)

(73) Assignees: SAMSUNG ELECTRONICS CO., LTD., Suwon-si (KR); WILL TECHNOLOGY CO., LTD., Suwon-si (KR)

( * ) Notice: Subject to any disclaimer, the term of this patent is extended or adjusted under 35 U.S.C. 154(b) by 179 days.

(21) Appl. No.: 18/083,184

(22) Filed: Dec. 16, 2022

(65) Prior Publication Data

US 2023/0221351 A1 Jul. 13, 2023

(30) Foreign Application Priority Data

Jan. 13, 2022 (KR) .......................... 10-2022-0005560

(51) Int. Cl.
*G01R 1/073* (2006.01)
*G01R 1/067* (2006.01)

(52) U.S. Cl.
CPC ..... *G01R 1/07342* (2013.01); *G01R 1/06738* (2013.01); *G01R 1/06755* (2013.01); *G01R 1/07357* (2013.01); *G01R 1/07378* (2013.01)

(58) Field of Classification Search
CPC ............ G01R 1/06738; G01R 1/06755; G01R 1/06722; G01R 1/073–07392
See application file for complete search history.

(56) References Cited

U.S. PATENT DOCUMENTS

| | | | |
|---|---|---|---|
| 7,667,471 B2 | 2/2010 | Kurotori et al. | |
| 8,984,661 B2 | 3/2015 | Weber-Bargioni et al. | |
| 9,465,048 B1 | 10/2016 | Wang | |
| 10,386,388 B2* | 8/2019 | Acconcia | G01R 1/07378 |
| 2008/0186040 A1* | 8/2008 | Hobbs | G01R 31/2863 |
| | | | 324/750.28 |
| 2010/0164519 A1 | 7/2010 | Sellathamby et al. | |
| 2013/0099813 A1* | 4/2013 | Hoshino | G01R 1/06755 |
| | | | 324/755.01 |
| 2015/0355235 A1* | 12/2015 | Hsu | G01R 1/07314 |
| | | | 156/247 |
| 2017/0122980 A1 | 5/2017 | Crippa et al. | |
| 2020/0341053 A1 | 10/2020 | Lee et al. | |
| 2023/0288447 A1* | 9/2023 | Felici | G01R 1/06761 |

FOREIGN PATENT DOCUMENTS

| | | |
|---|---|---|
| KR | 10-2000-0059206 A | 10/2000 |
| KR | 10-2013-0031593 A | 3/2013 |
| KR | 10-1499047 B1 | 3/2015 |
| KR | 10-2018-0031271 A | 3/2018 |
| KR | 10-1962529 B1 | 3/2019 |
| KR | 10-2062471 B1 | 1/2020 |
| KR | 10-2164373 B1 | 10/2020 |

* cited by examiner

*Primary Examiner* — Lee E Rodak
*Assistant Examiner* — Demetrius R Pretlow
(74) *Attorney, Agent, or Firm* — Sughrue Mion, PLLC

(57) ABSTRACT

Provided is a probe card including a lower plate, an upper plate spaced apart from the lower plate, and a needle that extends vertically to penetrate the lower plate and the upper plate, wherein the needle includes a first member that extends vertically and includes a first material, and a second member horizontally connected to the first member, wherein the second member includes a second material different from the first material.

20 Claims, 18 Drawing Sheets

FIG. 5
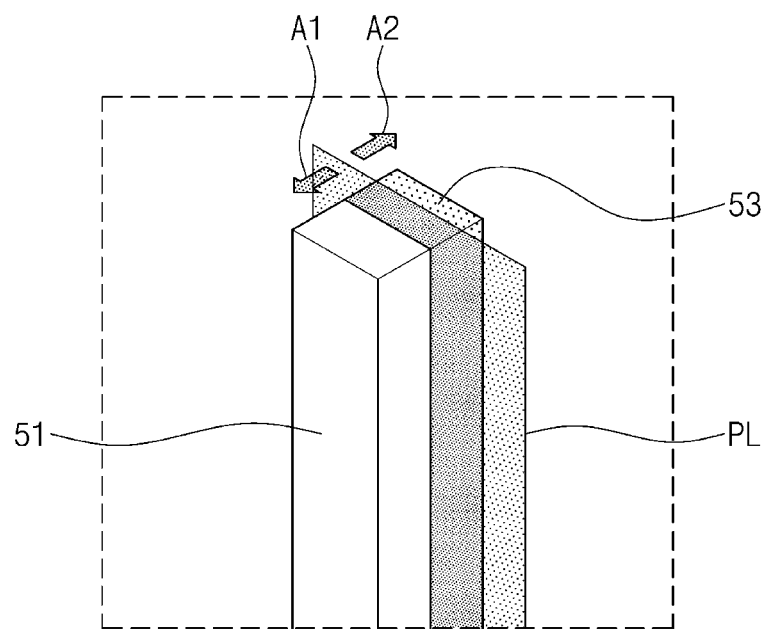
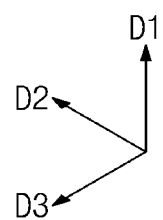

FIG. 16
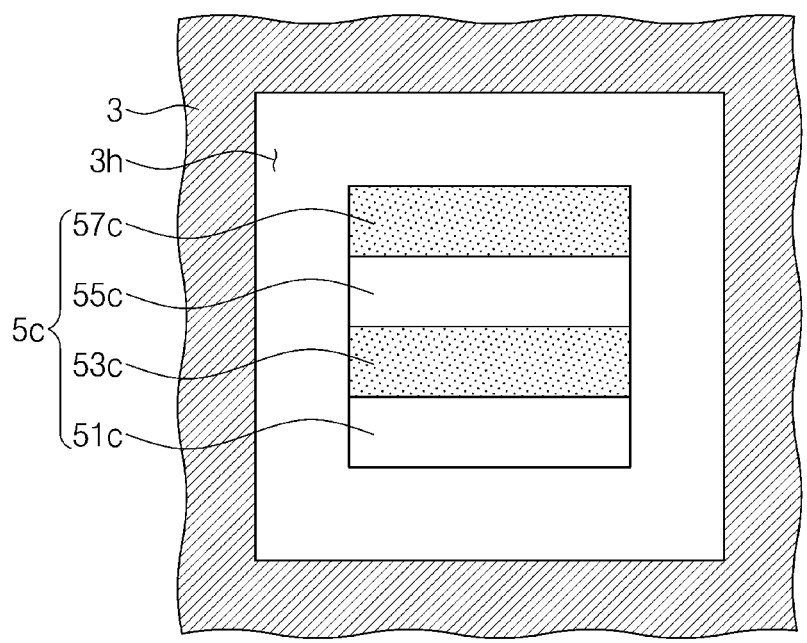
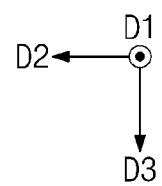

FIG. 17
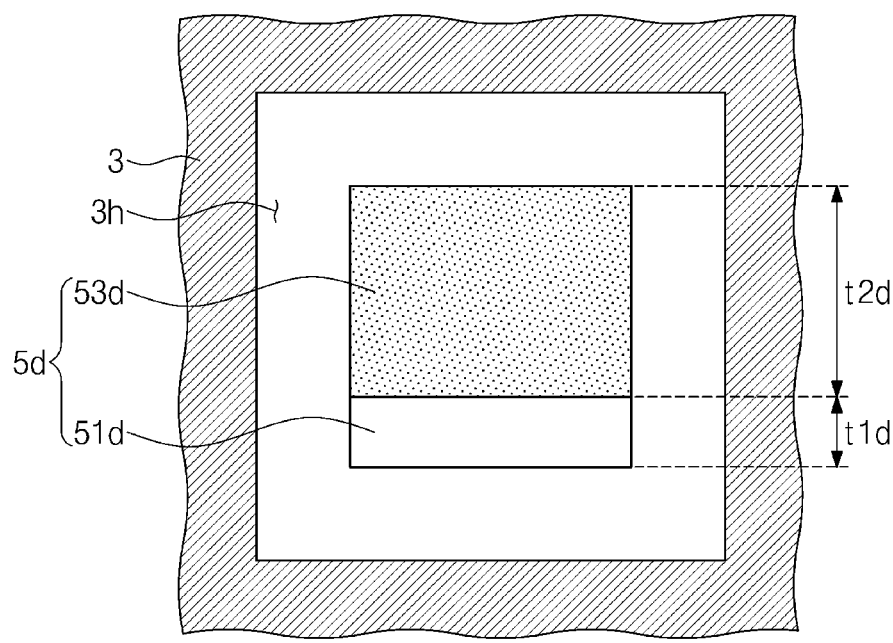
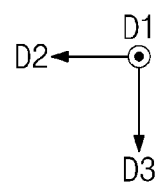

PROBE CARD AND SEMICONDUCTOR TEST METHOD USING THE SAME

CROSS-REFERENCE TO RELATED APPLICATION

This application claims priority to Korean Patent Application No. 10-2022-0005560 filed on Jan. 13, 2022 in the Korean Intellectual Property Office, the disclosure of which is hereby incorporated by reference in its entirety.

BACKGROUND

The present disclosure provides a probe card and a semiconductor test method using the same, and more particularly, a probe card configured to control movement of needles and a semiconductor test method using the same.

Various processes may be performed to fabricate a semiconductor device. For example, the semiconductor device may be fabricated through photolithography, etching, deposition, and test processes performed on a substrate. The test process may include an electrical die sorting (EDS) process that inspects electrical properties of each of chips that constitute a wafer. In such test process, a probe card can be used for electrical connection between a test and a substrate. The probe card may include needles in contact with a test-target object.

SUMMARY

One or more embodiments of the present disclosure provide a probe card configured to control deformation and/or movement of needles and a semiconductor test method using the same.

One or more embodiments provide a probe card configured to control scrubbing phenomena and a semiconductor test method using the same.

One or more embodiments provide a probe card configured to achieve an exact inspection and a semiconductor test method using the same.

The object of the present disclosure is not limited to the mentioned above, and other objects which have not been mentioned above will be clearly understood to those skilled in the art from the following description.

According to an aspect of an embodiment, there is provided a probe card including a lower plate, an upper plate spaced apart from the lower plate, and a needle that extends vertically to penetrate the lower plate and the upper plate, wherein the needle includes a first member that extends vertically and includes a first material, and a second member horizontally connected to the first member, wherein the second member includes a second material different from the first material.

According to another aspect of an embodiment, there is provided a probe card, including a lower plate including a lower through hole, an upper plate including an upper through hole and spaced apart from the lower plate in a first direction, and a needle inserted into the upper through hole and the lower through hole, the needle including a first region and a second region, wherein the needle is configured such that an elastic modulus of the first region on one side of a plane is different from an elastic modulus of the second region on another side of the plane, the plane being parallel to the first direction and passing through the needle.

According to another aspect of an embodiment, there is provided a semiconductor test method, including contacting a semiconductor device to a needle of a probe card, and detecting an electrical signal transferred through the needle from the semiconductor device, wherein the needle includes a first member that extends vertically and includes a first material, and a second member that includes a second material different from the first material, the second member being horizontally connected to the first member, and wherein contacting the semiconductor device to the needle includes pressing the semiconductor device to the needle, and deforming the needle

BRIEF DESCRIPTION OF DRAWINGS

The above and other objects and features of the present disclosure will become apparent by describing in detail embodiments thereof with reference to the accompanying drawings, in which:

FIGS. 4 and 5 illustrate perspective views showing a needle of a probe card according to some embodiments;

FIG. 16 illustrates a horizontal sectional view showing a needle according to some embodiments;

FIG. 17 illustrates a horizontal sectional view showing a needle according to some embodiments;

DETAIL DESCRIPTION OF EMBODIMENTS

Figure 1:
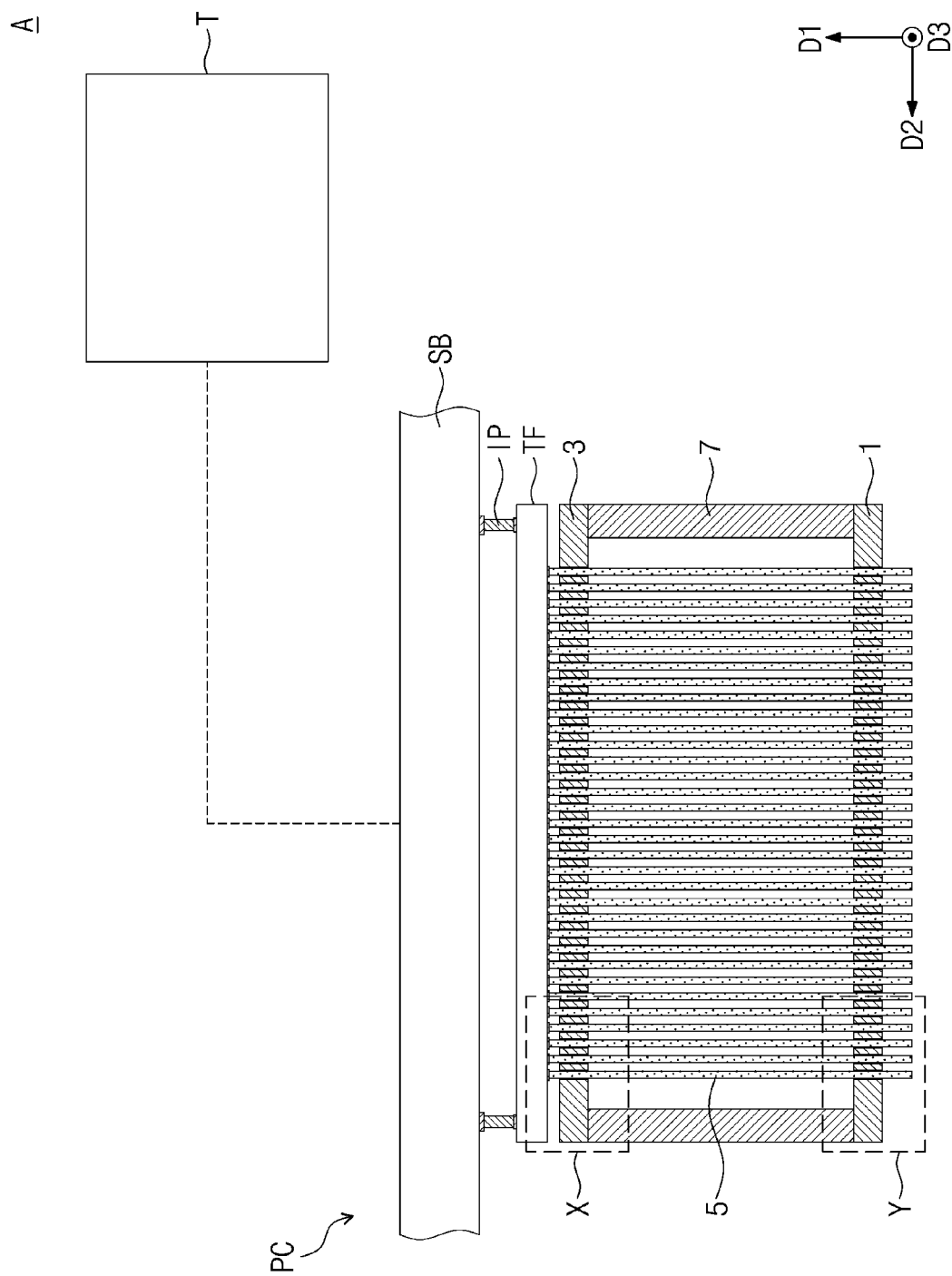
FIG. 1 illustrates a simplified schematic diagram showing a test apparatus according to some embodiments.

The following will now describe some embodiments of the present inventive concepts with reference to the accompanying drawings. Like reference numerals may indicate like components throughout the description. Embodiments described herein are example embodiments, and thus, the disclosure is not limited thereto.

It will be understood that when an element or layer is referred to as being "over," "above," "on," "below," "under," "beneath," "connected to" or "coupled to" another element or layer, it can be directly over, above, on, below, under, beneath, connected or coupled to the other element or layer or intervening elements or layers may be present. In contrast, when an element is referred to as being "directly over," "directly above," "directly on," "directly below," "directly under," "directly beneath," "directly connected to" or "directly coupled to" another element or layer, there are no intervening elements or layers present.

FIG. 1 illustrates a simplified schematic diagram showing a test apparatus according to some embodiments.

D1 may indicate a first direction, D2 may indicate a second direction that intersects the first direction D1, and D3 may indicate a third direction that intersects each of the first and second directions D1 and D2. The first direction D1 may be referred to as a vertical direction, and the second and third directions D2 and D3 may each be referred to as a horizontal direction.

Referring to FIG. 1, a test apparatus A may be provided. The test apparatus A may be a device that tests electrical performance of a semiconductor device. To test electrical performance of the semiconductor device, the test apparatus A may be electrically connected to a bonding body such as a pad and/or a bump of the semiconductor device. The test apparatus A may include a tester T and a probe card PC.

The tester T may apply a test power to test electrical performance of the semiconductor device. According to another embodiment, the tester T may receive electrical signals from the semiconductor device. The tester T may analyze electrical signals received from the semiconductor device to determine whether the semiconductor device is defective or not.

The probe card PC may electrically connect the tester T to the semiconductor device. The probe card PC may contact the semiconductor device. The probe card PC may include a substrate SB, an interposer IP, a space transformer TF, a lower plate 1, an upper plate 3, a connection member 7, and a needle 5.

The substrate SB may be electrically connected to the tester T. The substrate SB may intermediate an electrical connection between the needle 5 and the tester T. For example, a test power supplied from the tester T may be transferred through the substrate SB to the needle 5. According to another embodiment, an electrical signal transferred through the needle 5 from the semiconductor device may be delivered through the substrate SB to the tester T. The substrate SB may include a printed circuit board (PCB), but embodiments are not limited thereto.

The interposer IP may electrically connect the substrate SB to the space transformer TF. The interposer IP may be provided in plural. The plurality of interposers IP may be disposed spaced apart from each other in a horizontal direction between the substrate SB to the space transformer TF.

The space transformer TF may connect the substrate SB and the needle 5 to each other. The space transformer TF may be positioned beneath the substrate SB, and between the substrate SB and the upper plate 3. The space transformer TF may perform a pitch transform between the substrate SB and the needle 5.

The lower plate 1 may have a plate shape that extends in a horizontal direction. The lower plate 1 may include a dielectric material, such as, for example, one or more of ceramic and plastic. However, embodiments are not limited thereto, and a portion of the lower plate 1 may include a conductive material. The lower plate 1 may support a portion of the needle 5. The lower plate 1 may provide a lower through hole. A portion of the needle 5 may be inserted into the lower through hole. A detailed description thereof will be further discussed below.

The upper plate 3 may be upwardly spaced apart from the lower plate 1. Therefore, a space may be formed between the upper plate 3 and the lower plate 1. The upper plate 3 may have a plate shape that extends in a horizontal direction. The upper plate 3 may include a dielectric material, such as, for example, one or more of ceramic and plastic. However, embodiments are not limited thereto, and a portion of the upper plate 3 may include a conductive material. The upper plate 3 may support a portion of the needle 5. The upper plate 3 may provide an upper through hole. A portion of the needle 5 may be inserted into the upper through hole. A detailed description thereof will be further discussed below.

The connection member 7 may connect the lower plate 1 and the upper plate 3 to each other. For example, the connection member 7 may extend upwardly from the lower plate 1 to be connected to the upper plate 3. The connection member 7 may allow the lower plate 1 and the upper plate 3 to maintain a constant relative distance therebetween. However, embodiments are not limited thereto, and when the connection member 7 includes a flexible material, the relative distance between the lower and upper plates 1 and 3 may be changed by an external force.

The needle 5 may be electrically connected to the tester T. For example, the needle 5 may be electrically connected to the tester T through the substrate SB, the interposer IP, and the space transformer TF. In this case, a top end of the needle 5 may be coupled and connected to the space transformer TF. The needle 5 may include a conductive material. A detailed description thereof will be further discussed below.

The needle 5 may extend vertically in the D1 direction. For example, the probe card PC according to embodiments may be a vertical probe card. However, embodiments are not limited thereto.

The needle 5 may vertically penetrate the upper plate 3 and the lower plate 1. The needle 5 may be provided in plural. The plurality of needles 5 may be spaced apart from each other in a horizontal direction. Unless otherwise stated in specific circumstances, a single needle 5 will be discussed below. The needle 5 will be further discussed in detail below.

Figure 2:
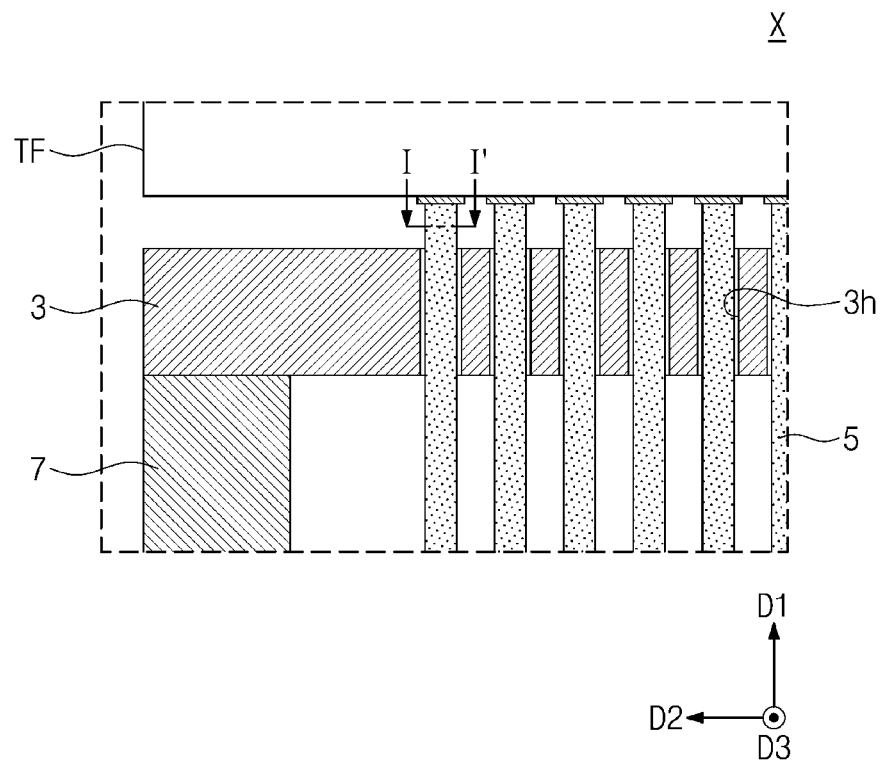
FIG. 2 illustrates an enlarged cross-sectional view showing section X of FIG. 1.
Figure 3:
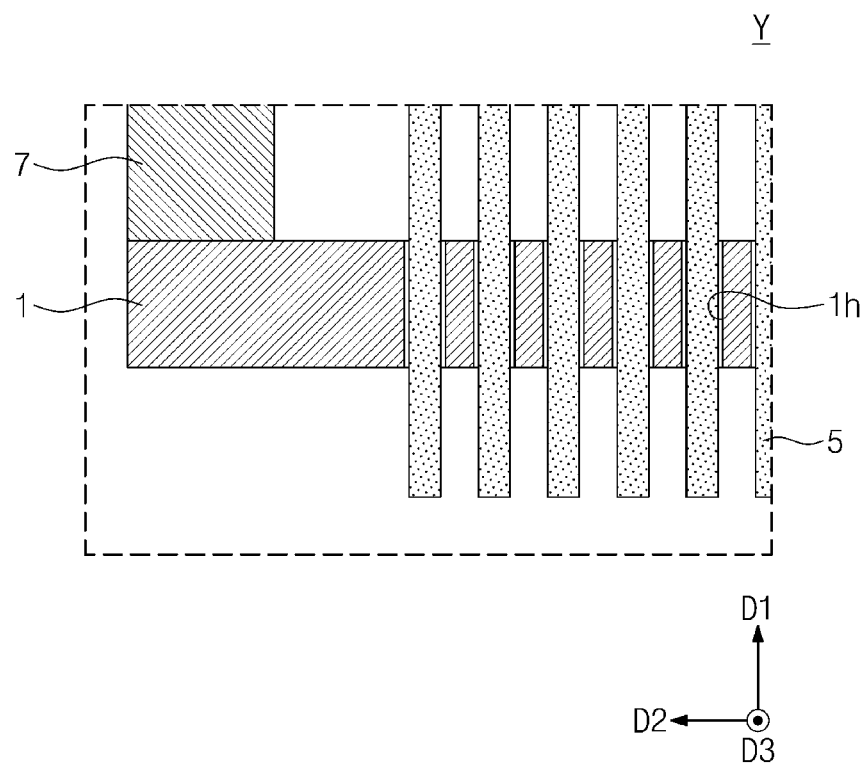
FIG. 3 illustrates an enlarged cross-sectional view showing section Y of FIG. 1.

FIG. 2 illustrates an enlarged cross-sectional view showing section X of FIG. 1. FIG. 3 illustrates an enlarged cross-sectional view showing section Y of FIG. 1.

Referring to FIG. 2, the upper plate 3 may provide an upper through hole 3h. The upper through hole 3h may extend in the first direction D1 to vertically penetrate the upper plate 3. The upper through hole 3h may be provided in plural. The plurality of upper through holes 3h may be spaced apart from each other in a horizontal direction. Unless otherwise stated in specific circumstances, a single upper through hole 3h will be discussed below.

The needle 5 may be inserted into the upper through hole 3h. The needle 5 may have a diameter less than a diameter of the upper through hole 3h. When the needle 5 is provided in plural, the plurality of needles 5 may be correspondingly inserted into the plurality of upper through holes 3h.

Referring to FIG. 3, the lower plate 1 may provide a lower through hole 1h. The lower through hole 1h may extend in the first direction D1 to vertically penetrate the lower plate 1. The lower through hole 1h may be provided in plural. The plurality of lower through holes 1h may be spaced apart from each other in a horizontal direction. Unless otherwise stated in specific circumstances, a single lower through hole 1h will be discussed below.

The needle 5 may be inserted into the lower through hole 1h. The diameter of the needle 5 may be less than a diameter of the lower through hole 1h. When the needle 5 is provided in plural, the plurality of needles 5 may be correspondingly inserted into the plurality of lower through holes 1h.

Figure 4:
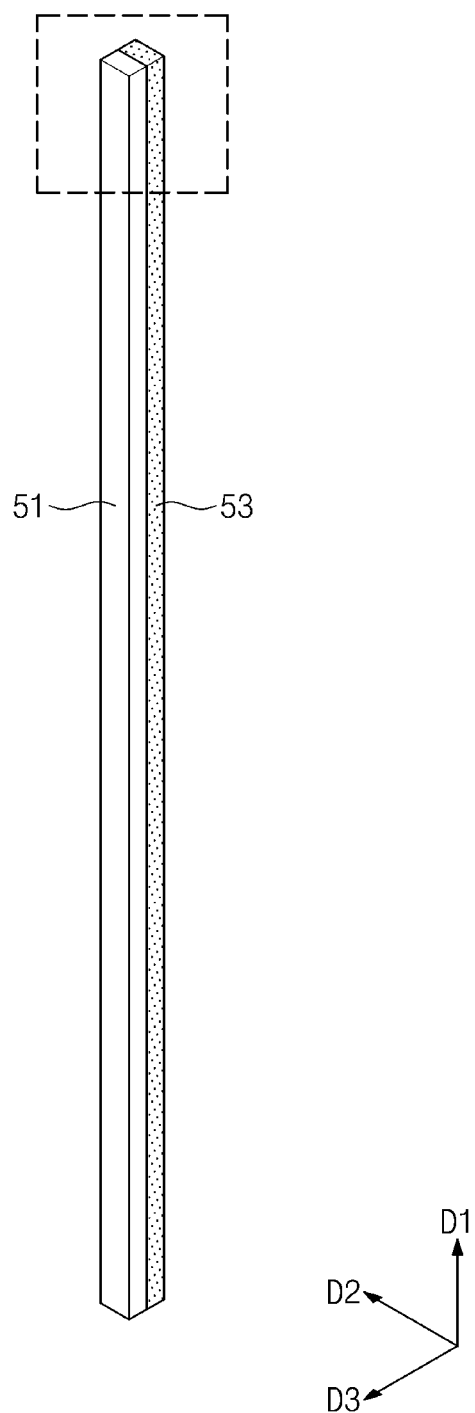

FIGS. 4 and 5 illustrate perspective views showing a needle of a probe card according to some embodiments of the present inventive concepts.

Referring to FIGS. 4 and 5, the needle 5 may extend in the first direction D1. A plane PL may be provided which is parallel to the first direction D1 while passing through the needle 5. For example, the plane PL may be parallel to the first direction D1 and the second direction D2. The plane PL may be vertical or perpendicular to the third direction D3. A first region of the needle 5 may indicate a portion on one side A1 of the plane PL. In addition, a second region of the needle 5 may indicate a portion on another side A2 of the plane PL. The first region may have an elastic modulus different from that of the second region. The first region and the second region may include different materials from each other. In this sense, the first region may include a material different from that of the second region to allow the first region to have a different elastic modulus from that of the second region. For example, the first region may include a first material, and the second region may include a second material different from the first material. The needle 5 may have an elastic modulus that is asymmetric with respect to the plane PL. In this case, the elastic modulus of the needle 5 may be asymmetric with respect to an axis of the needle 5, which axis extends in the first direction D1. In this description, a first member 51 may be a portion positioned on the first region of the needle 5. In addition, a second member 53 may be a portion positioned on the second region of the needle 5.

The first member 51 may include a conductive material. For example, the first member 51, or the first material, may include at least one selected from nickel (Ni), palladium (Pd), platinum (Pt), rhodium (Rh), gold (Au), copper (Cu), and silver (Ag). However, embodiments are not limited thereto, and the first member 51 may have a structure in which a dielectric is coated on a conductive material.

The second member 53 may include a conductive material. For example, the second member 53, or the second material, may include at least one selected from nickel (Ni), palladium (Pd), platinum (Pt), rhodium (Rh), gold (Au), copper (Cu), and silver (Ag). Alternatively, as discussed above, the second material may be different from the first material. The second member 53 may have a structure in which a dielectric is coated on a conductive material.

The second member 53 may be laterally coupled and connected to the first member 51. The first member 51 and the second member 53 may be coupled and connected to each other while a lateral surface of the first member 51 is contact with a lateral surface of the second member 53. The first member 51 and the second member 53 may be coupled and connected in various ways. For example, the first member 51 may be formed by a plating process that uses a mold, and then a plating process may be performed to form the second member 53 on the lateral surface of the first member 51. However, embodiments are not limited thereto, and the first member 51 and the second member 53 may be formed independently of each other and then coupled to each other.

The needle 5 may have a length of about 1 mm to about 10 mm. For example, a length in the first direction D1 of the needle 5 may range from about 3 mm to about 5 mm. However, embodiments are not limited thereto, and the length of the needle 5 may be changed in accordance with a detailed design.

The needle 5 may have a constant size at a vertical section thereof. For example, as illustrated in FIG. 4, the needle 5 may have a rectangular hexahedral shape. In this case, the first member 51 may have a vertical cross section that is the same as a vertical cross section of the second member 53. For example, each of the first member 51 and the second member 53 may have a rectangular shape at the vertical cross section thereof. However, embodiments are not limited thereto, and a bottom end of the needle 5 may have a tapered shape that decreases in a downward direction. For example, the bottom end of the needle 5 may have a tip shape. As another example, the needle 5 may have an irregular shape at a horizontal cross section thereof. As another example, the needle 5 may have at its horizontal cross section that is in a circular shape or any suitable shape other than a tetragonal shape.

Figure 6:
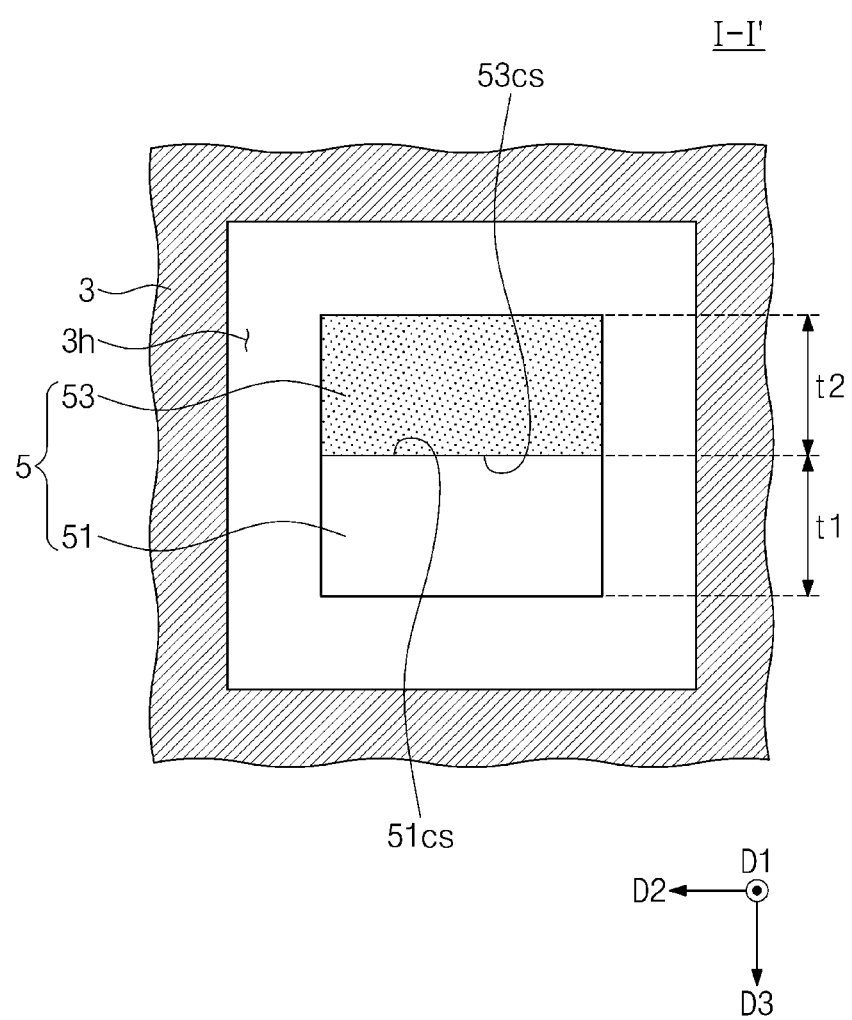
FIG. 6 illustrates a horizontal sectional view taken along line I-I' of FIG. 2.

FIG. 6 illustrates a horizontal sectional view taken along line I-I' of FIG. 2.

Referring to FIG. 6, the upper through hole 3h may have a tetragonal shape at a horizontal cross section thereof. The horizontal cross section of the upper through hole 3h may have a size greater than that of the horizontal cross section of the needle 5.

The horizontal cross section of the needle 5 may have a rectangular shape. In this case, the first member 51 may have a straight line at a first contact surface 51cs in contact with the second member 53. In addition, the second member 53 may have a straight line at a second contact surface 53cs in contact with the first member 51. A length in the second direction D2 of the needle 5 may range from about 10 µm to about 100 µm. In addition, a length in the third direction D3 of the needle 5 may range from about 10 µm to about 100 µm. However, embodiments are not limited thereto, and the horizontal cross section of the needle 5 may have a size that is changed in accordance with a detailed design. The horizontal cross section of the needle 5 may have a shape other than a rectangular shape. For example, the needle 5 may have a trapezoidal shape, an oval shape, or a circular shape at the horizontal cross section thereof.

A first thickness t1 may indicate a length in the third direction D3 of the first member 51. In addition, a second thickness t2 may indicate a length in the third direction D3 of the second member 53. The first thickness t1 and the second thickness t2 may be substantially the same as each other. In this case, the plane PL discussed with reference to FIG. 5 may bisect the horizontal section of the needle 5. However, embodiments are not limited thereto.

Figure 7:
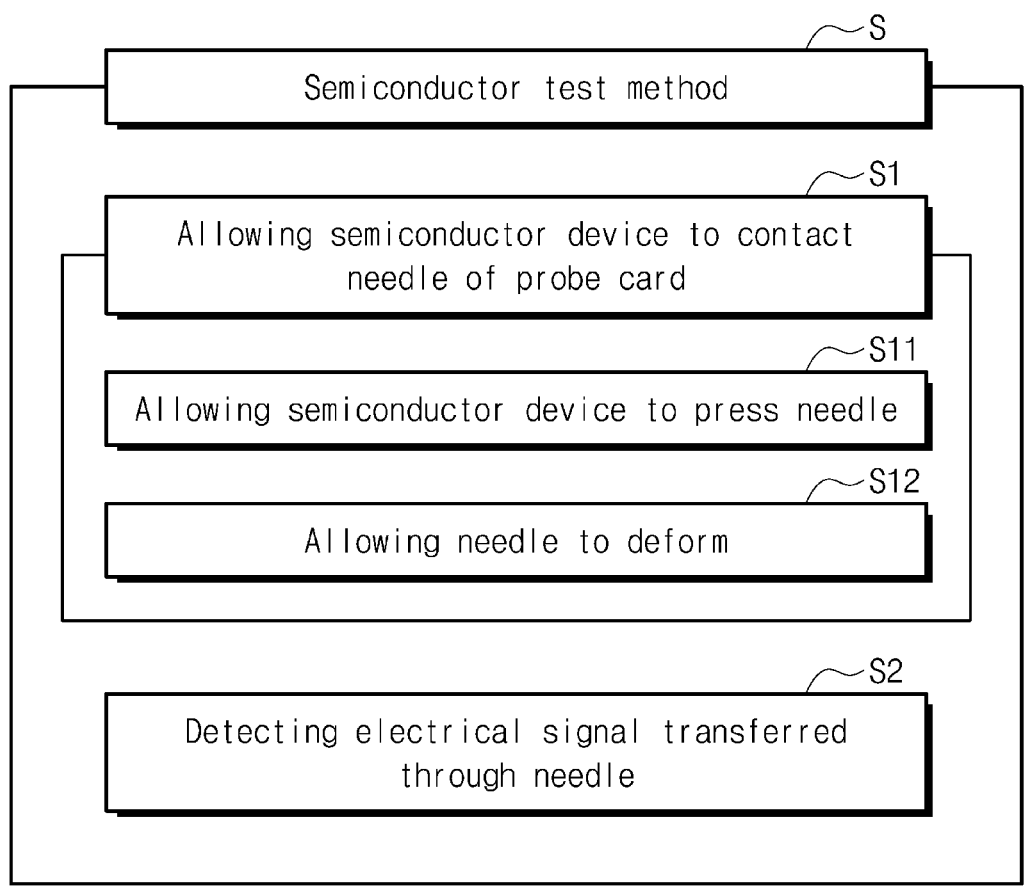
FIG. 7 illustrates a flow chart showing a semiconductor test method according to some embodiments.

FIG. 7 illustrates a flow chart showing a semiconductor test method according to some embodiments.

Referring to FIG. 7, a semiconductor test method S may be provided. The semiconductor test method S may be a method in which the test apparatus A discussed with reference to FIGS. 1 to 6 is used to test electrical performance of a semiconductor device. The semiconductor test method S may include a step S1 of allowing a semiconductor device to contact a needle of a probe card and a step S2 of detecting an electrical signal transferred through the needle.

The needle contact step S1 may include a step S11 of allowing the semiconductor device to press the needle and a step S12 of allowing the needle to deform.

With reference to FIGS. 8 to 13, the following will describe in detail the semiconductor test method S of FIG. 7.

FIGS. 8 to 13 illustrate diagrams showing a semiconductor test method according to the flow chart of FIG. 7.

Figure 8:
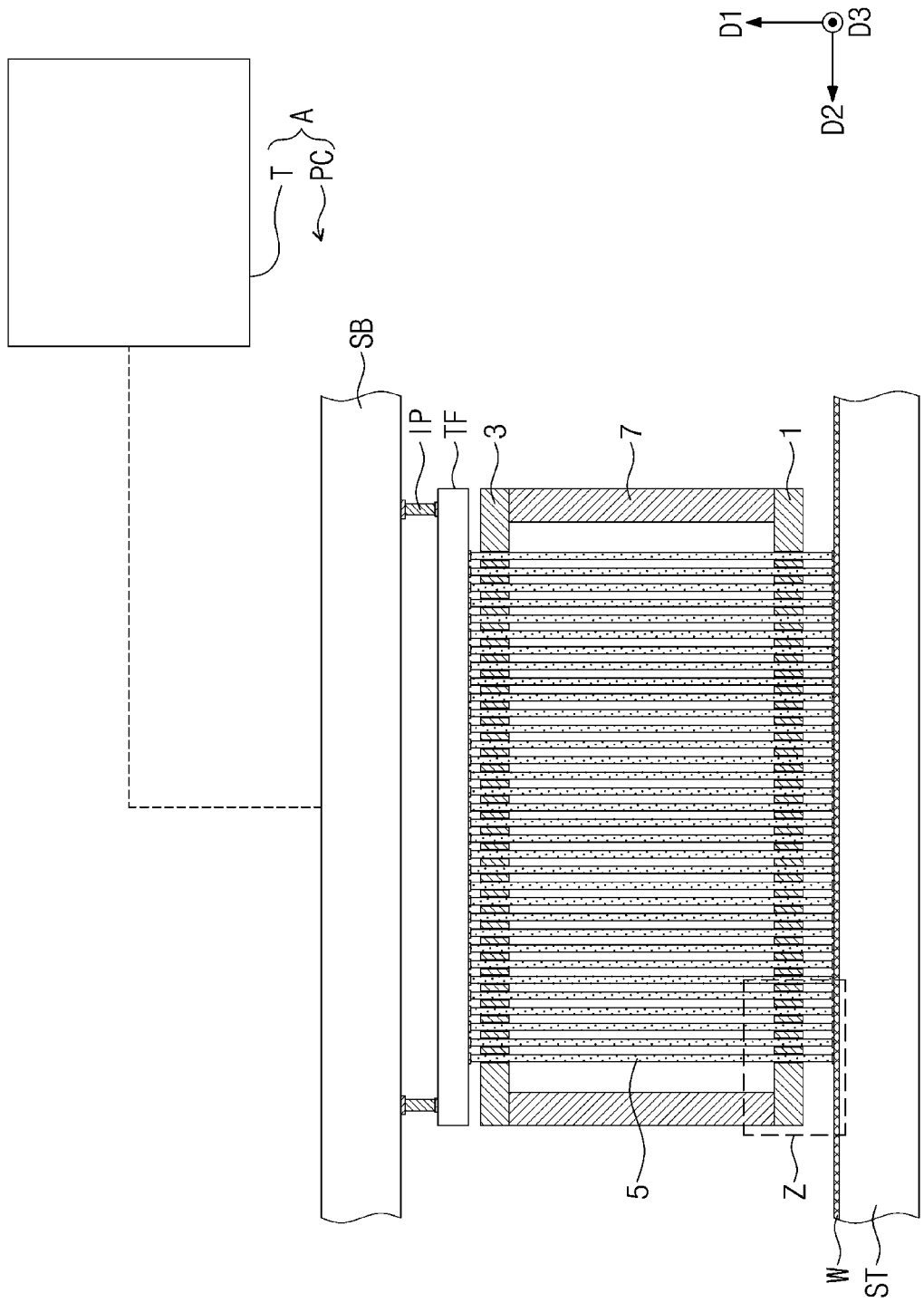
FIGS. 8 to 11 illustrate diagrams showing a semiconductor test method according to the flow chart of FIG. 7.
Figure 9:
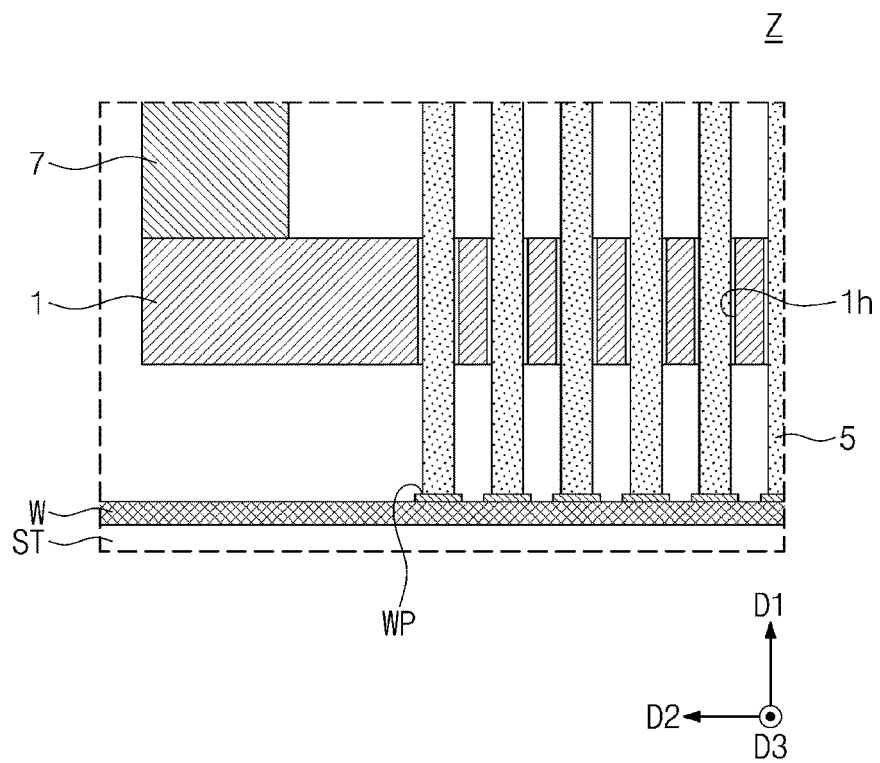

Referring to FIGS. 8 and 9, a semiconductor device W may be disposed on the stage ST. The semiconductor device W may be a substrate that requires inspection of electrical performance. For example, the semiconductor device W may be a wafer-level substrate. However, embodiments are not limited thereto, and the semiconductor device W may be a chip-level substrate. The semiconductor device W may be in contact with the needle 5. A bonding body Wp such as a bump and/or a pad may be provided on a top surface of the semiconductor device W. A bottom end of the needle 5 may be in contact with the bonding body Wp. When each of the bonding body Wp and the needle 5 is provided in plural, the plurality of needles 5 may be correspondingly in contact with the plurality of contact bodies Wp.

Figure 10:
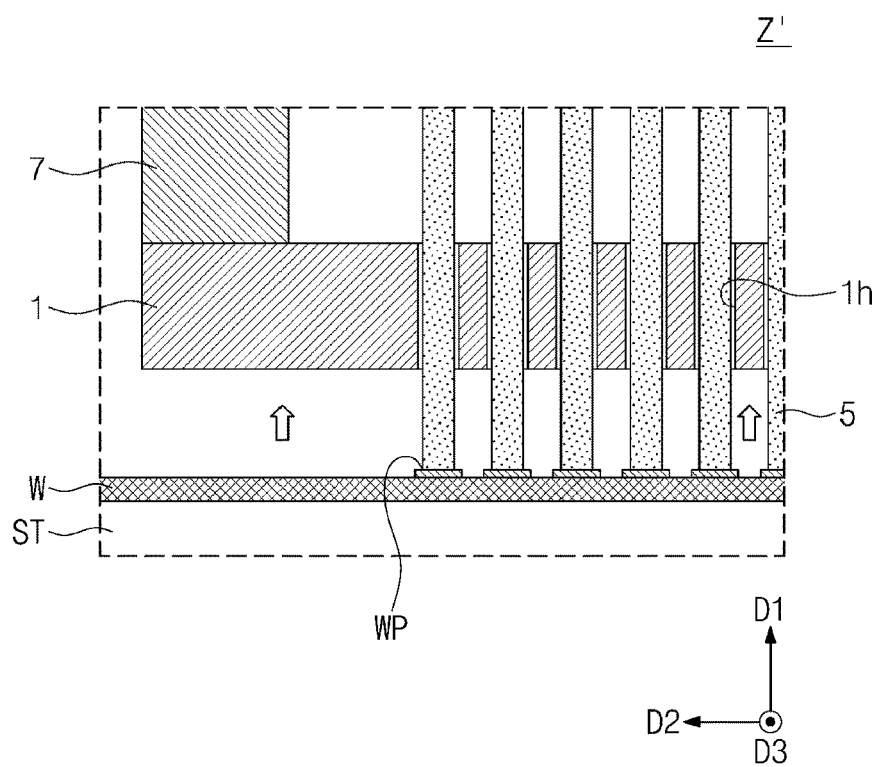

Referring to FIGS. 7 and 10, the needle pressing step S11 may include allowing the semiconductor device W and the lower plate 1 to become relatively close to each other. For example, the stage ST may rise to allow the semiconductor device W to move in the first direction D1. The bonding body Wp may press the needle 5. The needle 5 may be pressed in the first direction D1.

Figure 11:
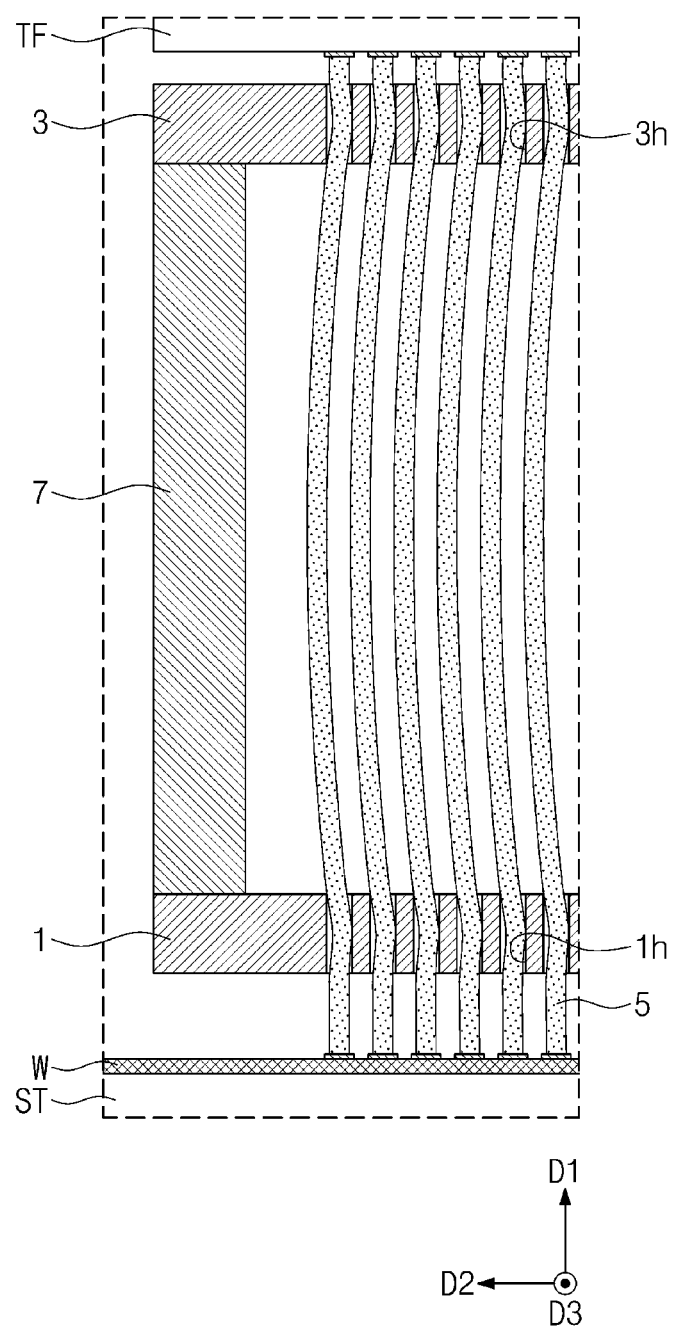

Referring to FIGS. 7 and 11, the needle deformation step S12 may include allowing the needle 5 to deform in the second direction D2. For example, when the bonding body Wp rises to press the needle 5, the needle 5 pressed in the first direction D1 may undergo buckling. The needle 5 may undergo the buckling in the second direction D2.

In addition, the needle deformation step S12 may include allowing the needle 5 to deform in the third direction D3. For example, when the needle 5 undergoes the buckling in the second direction D2, the needle 5 may become twisted. As the elastic modulus of the needle 5 is asymmetric with respect to the axis of the needle 5, when the needle 5 undergoes the buckling, the needle 5 may also undergo torsion. A torsion direction may be controlled by adjusting the elastic modulus of the first member 51 and the elastic modulus of the second member 53. Such torsion may be called deformation in the third direction D3.

Figure 12:
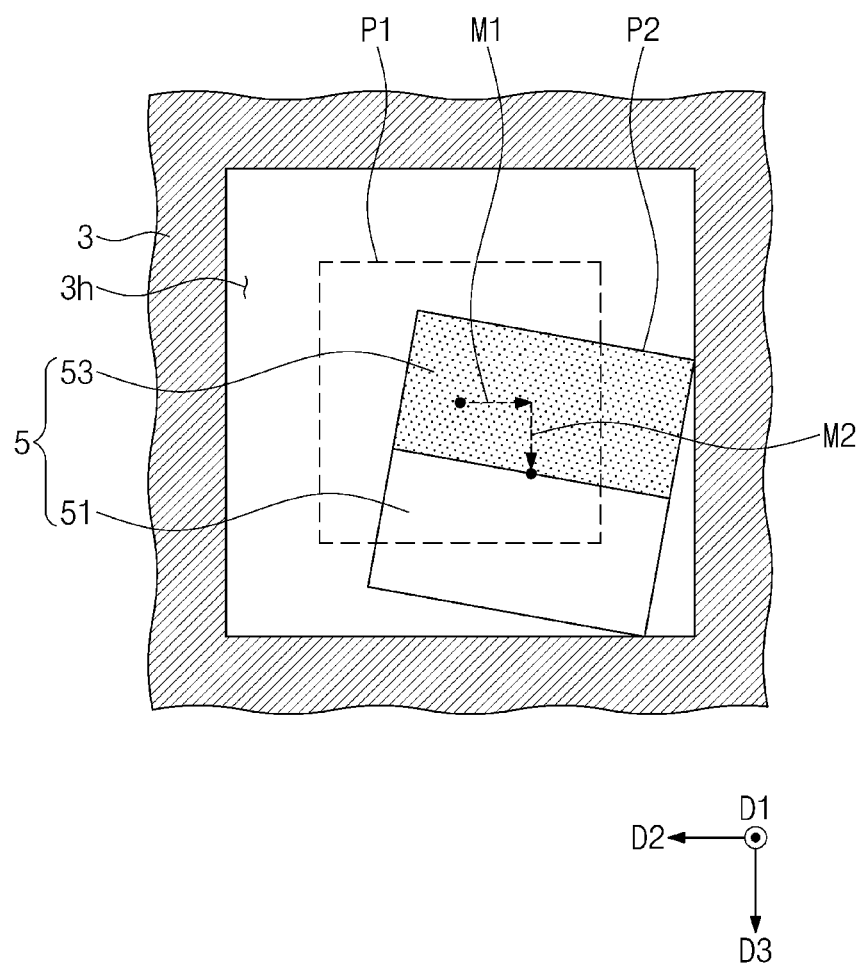
FIGS. 12 and 13 illustrate diagrams showing scrubbing that appears at the time of contact between a semiconductor device and a needle.

Referring to FIG. 12, before the deformation of the needle 5, a first position P1 may be defined to indicate a location of the needle 5 in the upper through hole 3h. When the needle 5 is deformed, the needle 5 may move to a second position P2 in the upper through hole 3h. The buckling of the needle 5 may cause the needle 5 to move in the second direction D2 or in a direction opposite to the second direction D2 in the upper through hole 3h. The torsion of the needle 5 may cause the needle 5 to move in the third direction D3 or in a direction opposite to the D3 direction in the upper through hole 3h. In FIG. 12, symbol M1 may denote movement due to the buckling of the needle 5. In FIG. 12, symbol M2 may denote movement due to the torsion of the needle 5.

Figure 13:
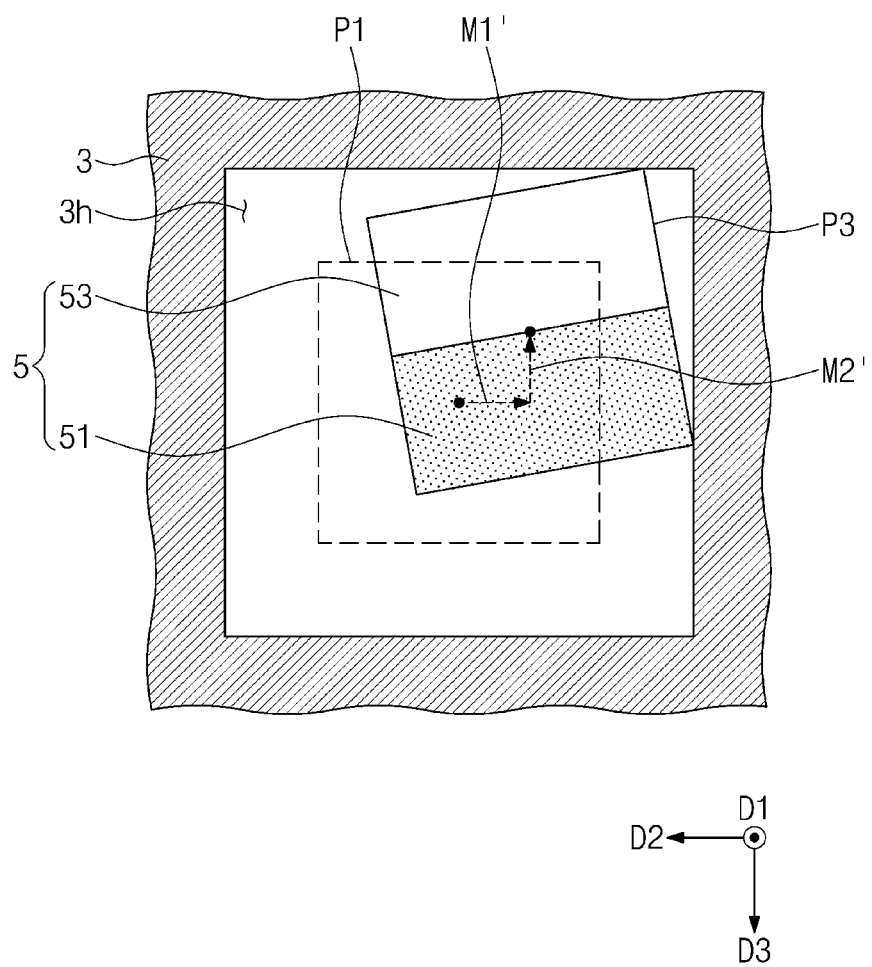

Referring to FIG. 13, the first and second members 51 and 53 may have their positions reverse to those of the first and second members 51 and 53 depicted in FIG. 12. In this case, when the needle 5 is deformed, the needle 5 may move to a third position P3 in the upper through hole 3h. The third position P3 may be different from the second position P2 discussed with reference to FIG. 12. In FIG. 13, symbol M1' may denote movement due to the buckling of the needle 5. In FIG. 13, symbol M2' may denote movement due to the torsion of the needle 5.

As discussed with reference to FIGS. 12 and 13, a deformation direction of the needle 5 may be controlled by adjusting an arrangement and elastic modulus of each of the first and second members 51 and 53. For example, an arrangement and elastic modulus of each of the first and second members 51 and 53 may be adjusted to control a torsion direction of the needle 5, which may make it possible to control a movement direction of the needle 5 in the third direction D3. It may be possible to control a movement direction of the needle 5 in a horizontal direction that intersects a buckling direction.

Referring back to FIGS. 1, 7, and 11, the electrical signal detection step S2 may include allowing an electrical signal to transfer from the semiconductor device W to the tester T. For example, the electrical signal may travel from the semiconductor device W to the tester T through bonding the body Wp, the needle 5, the space transformer TF, and the substrate SB. The tester T may analyze the electrical signal to determine whether the semiconductor device W is defective or not.

According to a probe card and a semiconductor test method using the same in accordance with some embodiments, an elastic modulus of a needle may be adjusted to control a deformation aspect of the needle. For example, two members, whose elastic moduli are different based on a buckling direction of the needle, may be disposed to induce torsion of the needle when the needle is buckled. Therefore, it may be possible to control a movement direction due to shape deformation of the needle and it may be possible to control a movement direction of the needle in a horizontal direction that intersects a buckling direction.

According to a probe card and a semiconductor test method using the same in accordance with some embodiments, a movement direction of the needle may be adjusted to control a contact position between the needle and a bonding body such as a pad and/or a bump. For example, when a pad presses the needle in contact with the bonding body such as a pad and/or a bump, it may be possible to control a change in contact position between the needle and the bonding body. Therefore, a scrubbing phenomenon may be controlled. For example, it may be possible to control a direction in which the needle moves to scrub the bonding body that is in contact with the needle. When the scrubbing phenomenon is controlled, a more accurate inspection may be performed on a semiconductor device.

According to a probe card and a semiconductor test method using the same in accordance with some embodiments, deformation aspects of a plurality of needles may be controlled constantly. Thus, the needles may be prevented from undesired contact therebetween. In such a case, an electrical short may be inhibited.

In the embodiments that follow, omission will be made to avoid description of features substantially identical or similar to those discussed with reference to FIGS. 1 to 13.

Figure 14:
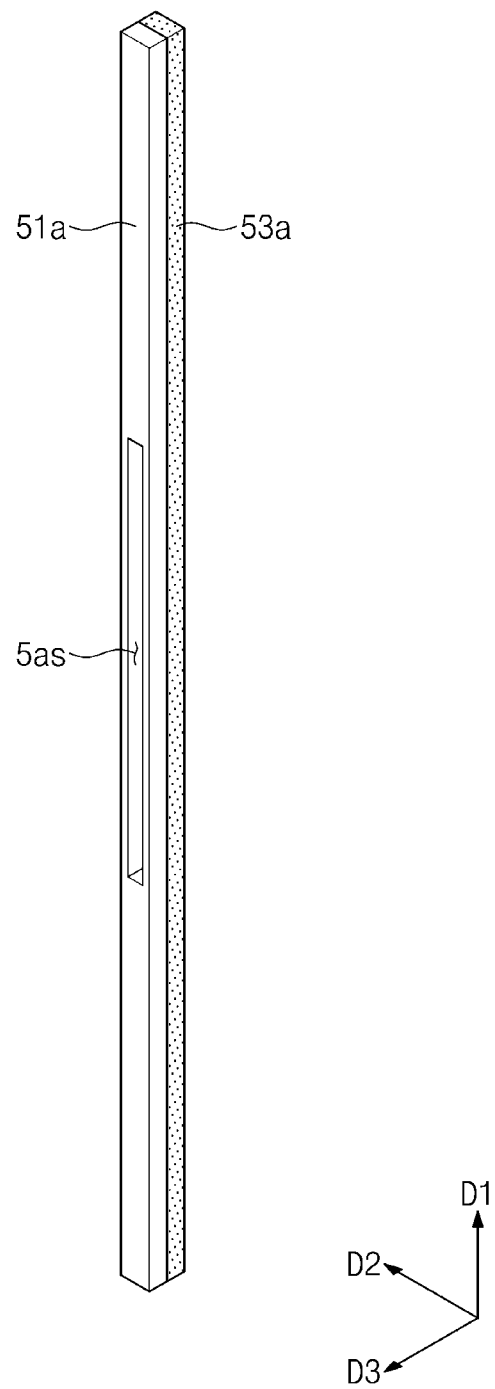
FIG. 14 illustrates a perspective view showing a needle of a probe card according to some embodiments.

FIG. 14 illustrates a perspective view showing a needle of a probe card according to some embodiments.

Referring to FIG. 14, a needle 5a may include a first member 51a and a second member 53a. The needle 5a may be provided with a slit 5as. The slit 5as may horizontally penetrate each of the first member 51a and the second member 53a. The slit 5as may extend a certain length in the first direction D1.

According to a probe card and a semiconductor test method using the same in accordance with some embodiments, a needle may have a slit to induce buckling of the needle. Therefore, a scrubbing phenomenon may be induced.

Figure 15:
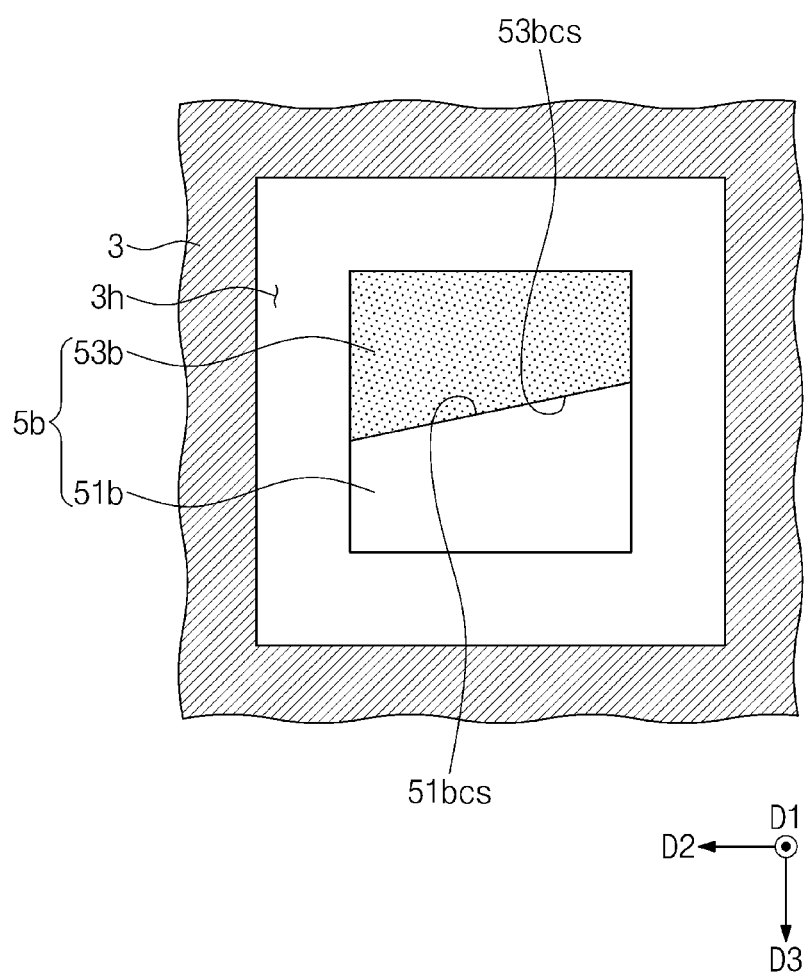
FIG. 15 illustrates a horizontal sectional view showing a needle according to some embodiments.

FIG. 15 illustrates a horizontal sectional view showing a needle according to some embodiments.

Referring to FIG. 15, a needle 5b may include a first member 51b and a second member 53b. The first member 51b may have a first contact surface 51bcs in contact with the second member 53b, and the first contact surface 51bcs may be inclined in the second direction D2. In addition, the second member 53b may have a second contact surface 53bcs in contact with the first contact surface 51bcs, and the second contact surface 53bcs may be inclined in the second direction D2.

FIG. 16 illustrates a horizontal sectional view showing a needle according to some embodiments.

Referring to FIG. 16, a needle 5c may include a first member 51c, a second member 53c, a third member 55c, and a fourth member 57c. The third member 55c may be coupled and connected to the second member 53c across which the third member 55c and the first member 51c are opposite to each other. In addition, the fourth member 57c may be coupled and connected to the third member 55c with respect to which the fourth member 57c and the second member 53c are opposite to each other. In such a case, the first member 51c, the second member 53c, the third member 55c, and the fourth member 57c may be arranged along the third direction D3.

The first member 51c and the third member 55c may include the same material. For example, the first member 51c may have an elastic modulus that is the same as an elastic modulus of the third member 55c. In addition the second member 53c and the fourth member 57c may include the same material. For example, the second member 53c may have an elastic modulus that is the same as an elastic modulus of the fourth member 57c. However, embodiments are not limited thereto, and the first, second, third, and fourth members 51c, 53c, 55c, and 57c may have their elastic moduli that are different from each other.

FIG. 17 illustrates a horizontal sectional view showing a needle according to some embodiments.

Referring to FIG. 17, a needle 5d may include a first member 51d and a second member 53d. A first thickness t1d may indicate a thickness of the first member 51d. A second thickness t2d may indicate a thickness of the second member 53d. The first thickness t1d and the second thickness t2d may be different from each other. For example, the second thickness t2d may be greater than the first thickness t1d. Therefore, when viewed on a horizontal section of the needle 5d, the first member 51d may have an area that is different from an area of the second member 53d.

According to a probe card and a semiconductor test method using the same in accordance with some embodiments, a first member may have a size that is different from a size of a second member. When adjusting the sizes of the first and second members, it may be possible to control the degree of torsion deformation of a needle. In addition, when adjusting the sizes of the first and second members, it may be possible to control electrical properties of the needle. For example, the adjustment of the sizes of the first and second members may control electrical conductivity of the needle.

Figure 18:
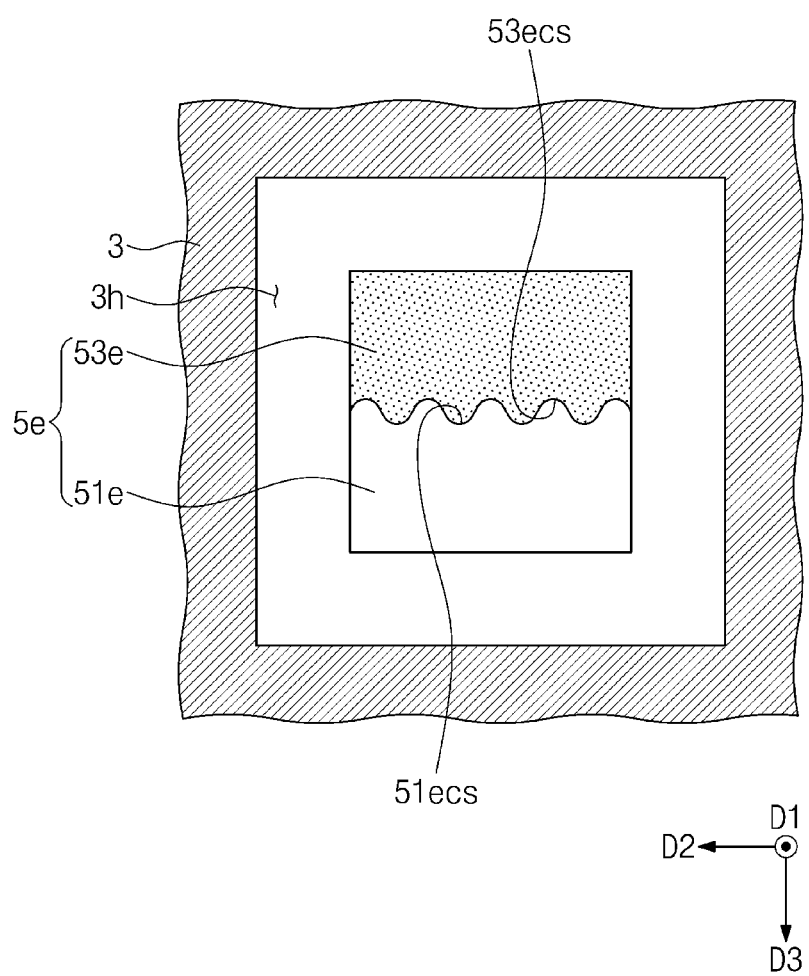
FIG. 18 illustrates a horizontal sectional view showing a needle according to some embodiments.

FIG. 18 illustrates a horizontal sectional view showing a needle according to some embodiments.

Referring to FIG. 18, a needle 5e may include a first member 51e and a second member 53e. The first member 51e may have a first contact surface 51ecs in contact with the second member 53e, and the first contact surface 51ecs may have a curved shape on a horizontal section of the needle 5e. In addition, the second member 53e may have a second contact surface 53ecs in contact with the first contact surface 51ecs, and on the horizontal section of the needle 5e, the second contact surface 53ecs may have a curved shape that is complementary to that of the first contact surface 51ecs. However, embodiments are not limited thereto, and the first contact surface 51ecs and the second contact surface 53ecs may have their shapes that correspond to each other on the horizontal section of the needle 5e.

According to a probe card and a semiconductor test method using the same in accordance with some embodiments, an increased contact area may be provided between a first member and a second member. Therefore, a bonding force may be increased between the first member and the second member. Accordingly, it may be possible to prevent delamination between the first member and the second member.

Figure 19:
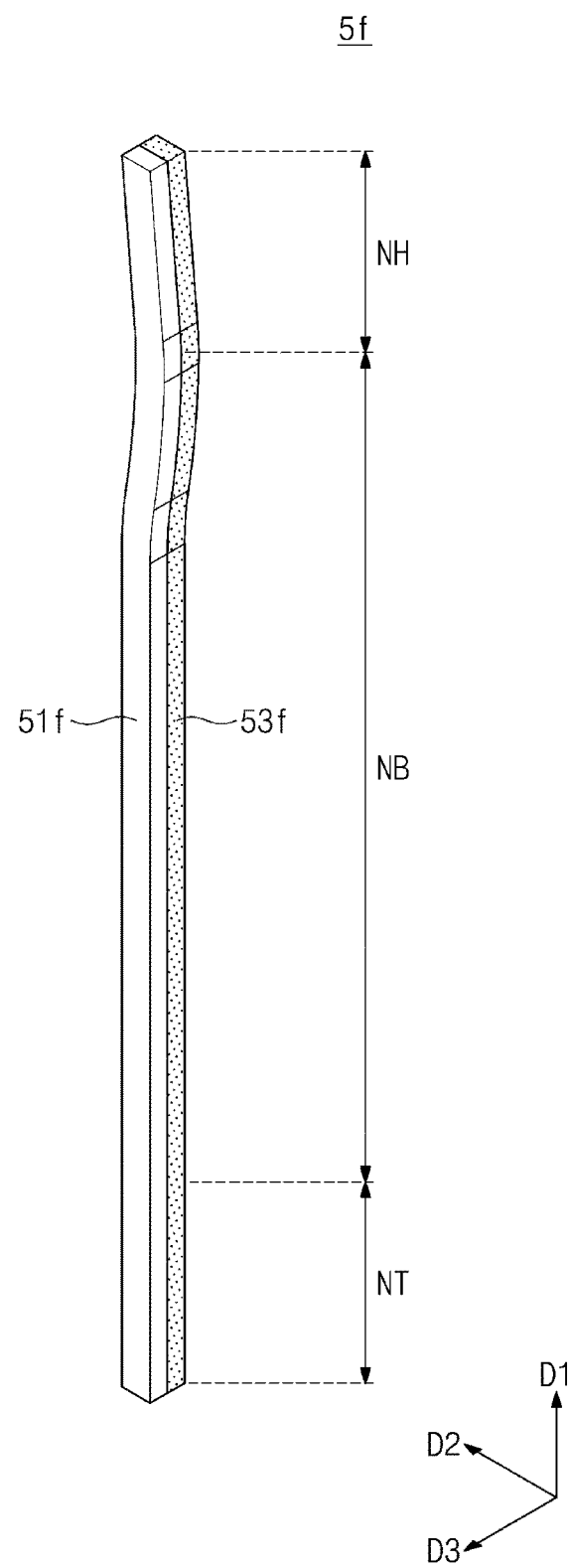
FIG. 19 illustrates a perspective view showing a needle of a probe card according to some embodiments.

FIG. 19 illustrates a perspective view showing a needle of a probe card according to some embodiments.

Referring to FIG. 19, a needle 5f may include a first member 51f and a second member 53f. The needle 5f may have a bent shape. For example, the needle 5f may have a needle head NH, a needle body NB, and a needle tip NT.

The needle head NH may extend in the first direction D1. Therefore, an extending direction of the needle head NH may be parallel to the plane PL discussed with reference to FIG. 5. The needle head NH may be inserted into the upper through hole (see 3h of FIG. 2).

The needle body NB may be positioned beneath the needle head NH. The needle body NB may be bent from the needle head NH. An extending direction of the needle body NB may be parallel to a plane defined by the first direction D1 and the second direction D2. Thus, the extending direction of the needle body NB may be parallel to the plane PL discussed with reference to FIG. 5. The needle body NB may have an arch shape, but embodiments are not limited thereto.

The needle tip NT may extend in the first direction D1. Thus, an extending direction of the needle tip NT may be parallel to the plane PL discussed with reference to FIG. 5. The needle tip NT may be positioned beneath the needle body NB. The needle tip NT may be inserted into the lower through hole (see 1h of FIG. 3).

According to a probe card and a semiconductor test method using the same in accordance with some embodiments, a needle may become bent to induce buckling thereof. For example, when the needle is bent in one direction, a buckling direction of the needle may be induced in one direction. Therefore, a scrubbing phenomenon may be controlled.

Figure 20:
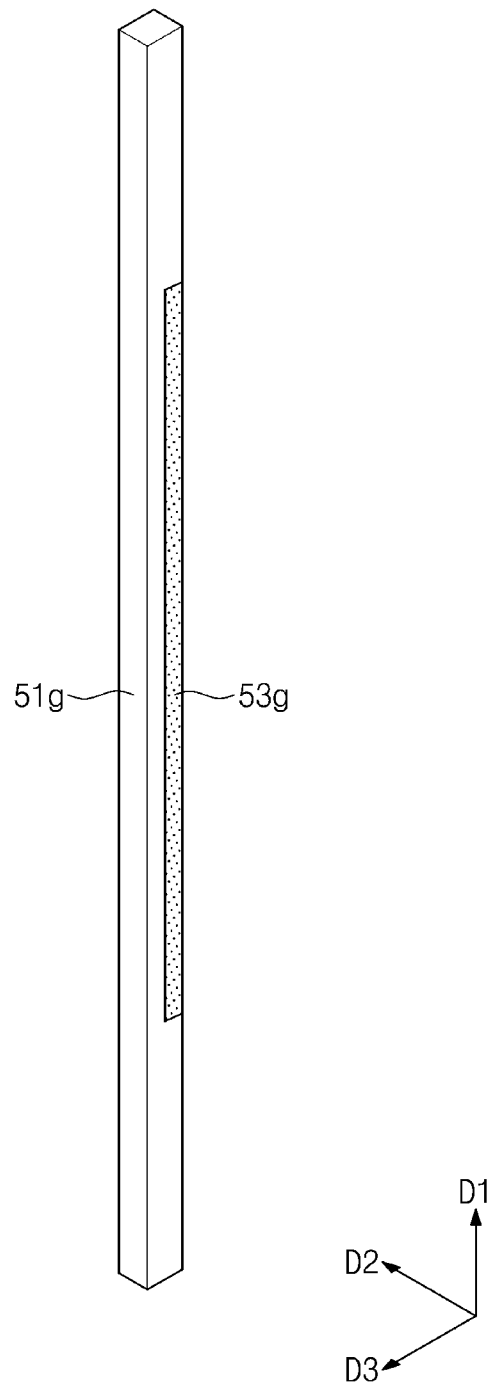
FIG. 20 illustrates a perspective view showing a needle of a probe card according to some embodiments.

FIG. 20 illustrates a perspective view showing a needle of a probe card according to some embodiments.

Referring to FIG. 20, a needle 5g may include a first member 51g and a second member 53g. A length in the first direction D1 of the second member 53g may be less than a length in the first direction D1 of the first member 51g. The first member 51g may be provided adjacent to and surround top and bottom surfaces of the second member 53g.

According to a probe card and a semiconductor test method using the same in accordance with embodiments, it may be possible to control deformation and/or movement of a needle.

According to a probe card and a semiconductor test method using the same in accordance with embodiments, it may be possible to control a scrubbing phenomenon.

According to a probe card and a semiconductor test method using the same in accordance with embodiments, it may be possible to more accurately inspect a semiconductor device.

Effects of the present inventive concepts are not limited to the mentioned above, other effects which have not been mentioned above will be clearly understood to those skilled in the art from the following description.

While embodiments have been described with reference to the figures, it will be understood by those of ordinary skill in the art that various changes in form and details may be made therein without departing from the spirit and scope as defined by the following claims and their equivalents.

What is claimed is:

1. A probe card, comprising:
   a lower plate including a first lower through hole and a second lower through hole;
   an upper plate including a first upper through hole and a second upper through hole, and spaced apart from the lower plate in a vertical direction;

a first needle that extends vertically to penetrate the first lower through hole and the first upper through hole; and
a second needle that extends vertically to penetrate the second lower through hole and the second upper through hole,
wherein each of the first and second needles comprises:
a first member that extends vertically and comprises a first material; and
a second member horizontally connected to the first member,
wherein the second member comprises a second material different from the first material,
wherein each of the first and second upper through holes comprises:
a first surface and second surface spaced apart from each other in a first horizontal direction perpendicular to the vertical direction, the first surface and the second surface extending in a second horizontal direction perpendicular to the vertical direction and the first horizontal direction; and
a third surface and a fourth surface spaced apart from each other in the second horizontal direction, the third surface and the fourth surface extending in the first horizontal direction,
wherein the first needle is deformed by pressure to contact the first and third surfaces of the first upper through hole and being spaced apart from the second and fourth surfaces of the first upper through hole,
wherein the second needle is deformed by pressure to contact the first and third surfaces of the second upper through hole and the second needle is spaced apart from the second and fourth surfaces of the second upper through hole.

2. The probe card of claim 1, wherein a shape of a vertical cross section of the first member is the same as a shape of a vertical cross section of the second member.

3. The probe card of claim 1, wherein each of the first and second needles further comprises a third member connected to the second member, and
wherein the third member and the first member are opposite to each other with respect to the second member.

4. The probe card of claim 1, wherein the first material comprises at least one of nickel (Ni), palladium (Pd), platinum (Pt), rhodium (Rh), gold (Au), copper (Cu), and silver (Ag).

5. The probe card of claim 1, wherein, on an area of a horizontal cross section of the first member is different from an area of a horizontal cross section of the second member.

6. The probe card of claim 1, wherein each of the first and second needles comprises a plurality of needles, and
wherein the plurality of needles are spaced apart from each other horizontally.

7. The probe card of claim 1, wherein a size of a horizontal cross section of the first needle is less than a size of a horizontal cross section of the first upper through hole.

8. The probe card of claim 1, wherein an elastic modulus of the first material is different from an elastic modulus of the second material.

9. The probe card of claim 1, wherein each of the first and second needles includes a slit that horizontally penetrates the first member and the second member.

10. The probe card of claim 1, wherein on a horizontal cross section of the first needle, a first contact surface of the first member has a curved shape, the first contact surface being in contact with the second member, and on the horizontal cross section, a second contact surface of the second member has a curved shape that is complementary to the curved shape of the first contact surface, the second contact surface being in contact with the first contact surface.

11. The probe card of claim 1, further comprising a space transformer on the upper plate and electrically connected to the first needle.

12. A probe card, comprising:
a lower plate including a first lower through hole and a second lower through hole;
an upper plate including a first upper through hole and a second upper through hole, and spaced apart from the lower plate in a vertical direction;
a first needle inserted into the first upper through hole and the first lower through hole; and
a second needle inserted into the second upper through hole and the second lower through hole,
wherein each of the first and second needles comprise a first region and a second region,
wherein each of the first and second needles are configured such that an elastic modulus of the first region on one side of a plane is different from an elastic modulus of the second region on another side of the plane, the plane being parallel to the vertical direction and passing through each of the first and second needles,
wherein each of the first and second upper through holes comprises:
a first surface and second surface spaced apart from each other in a first horizontal direction perpendicular to the vertical direction, the first surface and the second surface extending in a second horizontal direction perpendicular to the vertical direction and the first horizontal direction; and
a third surface and a fourth surface spaced apart from each other in the second horizontal direction, the third surface and the fourth surface extending in the first horizontal direction,
wherein the first needle is deformed by pressure to contact the first and third surfaces of the first upper through hole and being spaced apart from the second and fourth surfaces of the first upper through hole, and
wherein the second needle is deformed by pressure to contact the first and third surfaces of the second upper through hole and the second needle is spaced apart from the second and fourth surfaces of the second upper through hole.

13. The probe card of claim 12, wherein the plane bisects a horizontal cross section of the first needle.

14. The probe card of claim 12, wherein each of the first and second needles comprises:
a needle head inserted into the upper through hole; and
a needle body on the needle head and bent from the needle head,
wherein an extending direction of each of the needle head and the needle body is parallel to the plane.

15. The probe card of claim 14, wherein the needle body has an arch shape.

16. The probe card of claim 14, wherein the first needle further comprises a needle tip on the needle body opposite to the needle head, and
wherein the needle tip is inserted into the first lower through hole.

17. The probe card of claim 12, wherein a material of the first region and a material of the second region are different from each other.

18. The probe card of claim 12, wherein a horizontal cross section of the first needle has a tetragonal shape.

19. A semiconductor test method, comprising:
contacting a semiconductor device to a first needle and second needle of a probe card; and
detecting an electrical signal transferred through the first and second needles from the semiconductor device,
wherein each of the first and second needles comprise:
a first member that extends vertically and comprises a first material; and
a second member that comprises a second material different from the first material, the second member being horizontally connected to the first member,
wherein the probe card comprises:
a lower plate including a first lower through hole and a second lower through hole;
an upper plate including a first upper through hole and a second upper through hole, and spaced apart from the lower plate in a vertical direction,
wherein each of the first and second upper through holes comprises:
a first surface and second surface spaced apart from each other in a first horizontal direction perpendicular to the vertical direction, the first surface and the second surface extending in a second horizontal direction perpendicular to the vertical direction and the first horizontal direction; and
a third surface and a fourth surface spaced apart from each other in the second horizontal direction, the third surface and the fourth surface extending in the first horizontal direction, and
wherein contacting the semiconductor device to the first and second needles comprises:
pressing the semiconductor device to the first and second needles; and
deforming the first and second needles so that the first and second needles move in the same direction, contact the first and third surfaces of the first upper through hole, and are spaced apart from the second and fourth surfaces of the first upper through hole.

20. The semiconductor test method of claim 19, wherein pressing the semiconductor device to the first and second needles comprises the semiconductor device moving in a first direction to press the first and second needles, and
wherein deforming the first and second needles comprises:
deforming the first and second needles in the first horizontal direction that is perpendicular to the vertical direction; and
deforming the first and second needles in the second horizontal direction that is perpendicular to each of the vertical direction and the first horizontal direction.

* * * * *